United States Patent Office 3,210,690
Patented Oct. 5, 1965

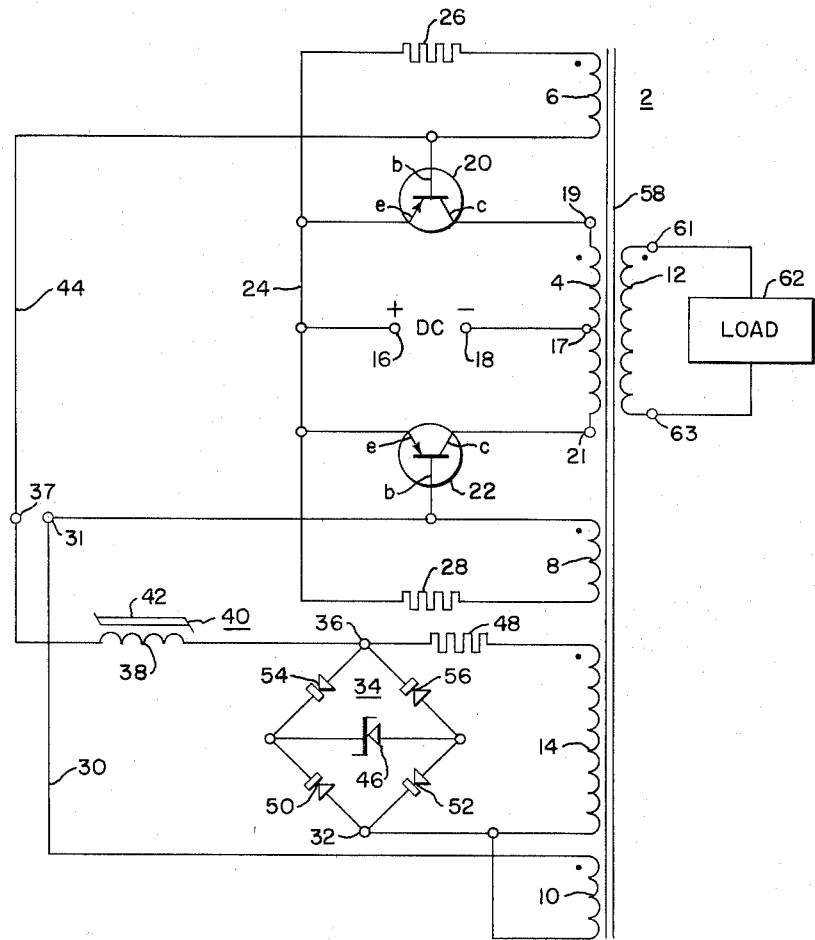

3,210,690
CONTROLLED FREQUENCY STATIC INVERTER
Boris Mokrytzki, Monroeville, Pa., and Russell A. Stuart, Largo, Fla., assignors to Westinghouse Electric Corporation, Pittsburgh, Pa., a corporation of Pennsylvania
Filed Mar. 19, 1963, Ser. No. 266,374
1 Claim. (Cl. 331—113)

This invention relates generally to switching apparatus and more particularly to inverters for inverting a direct current into alternating current.

An object of this invention is to provide a control system for an inverter in which the output frequency will be substantially independent of the magnitude of the input voltage.

A further object of this invention is to provide a compensating winding in a push-pull type of inverter for compensating changes in feedback voltage.

Further objects of the invention will be apparent from the specification and the appended claims and the drawings appended hereto, in which the sole figure represents schematically an inverter embodying the invention.

Referring to the drawings by characters of reference, the numeral 2 designates a transformer having a primary winding 4 and secondary windings 6, 8, 10, 12 and 14. Each of the windings is illustrated as having a dotted end terminal and an undotted terminal for indicating the polarity of the windings, the dotted terminals being of like polarity and the undotted terminals being of the opposite polarity. Power for the inverter may be supplied from any suitable source to the direct current input terminals 16 and 18, respectively.

The energization of the primary winding 4 is controlled by a pair of switching triodes 20 and 22. As indicated the triodes are semiconductor p-n-p transistors having emitters e, collectors c and bases b. In the particular embodiment illustrated, the control current for the transistors or triodes 20 and 22 is applied between one control terminal or emitter e and the second control terminal or base b. The input terminal 16, connected to the positive terminal of the direct current supply, is connected to each of the emitters e through a common bus 24, while the negative supply terminal 18 is directly connected to the center tap or terminal 17 of the winding 4. The dotted terminal 19 of the winding 4 is connected to the collector c of the transistor 20, while the undotted terminal 21 of the winding is connected to the collector c of the transistor 22. The terminals 17, 19 and 21 may be considered as input terminals when considered from the standpoint of the transformer 2 or power output terminals when considered from the standpoint of the power paths through the transistors or valve devices 20 and 22.

Feedback current for the transistor 20 is supplied from the winding 6 which has its dotted terminal connected through a current limiting resistor 26, to the emitter e of the transistor 20, through the bus 24 and its undotted end connected directly to the base b. Similarly, the winding 8 is connected between the base b and emitter e of the transistor 22 through a current limiting resistor 28, however, in this instance, the polarity of the winding 8 is reversed so that its dotted terminal is directly connected to the base b and its undotted terminal is connected to the emitter e to correspond to the reversed condition of the connection of collector c of transistor 22 to the winding 4.

The dotted terminal of the winding 10 is connected by means of a conductor 30 to a first control potential output terminal 31. This terminal 31 is connected to the base b of the transistor 22. The undotted terminal of this winding 10 is connected to one terminal 32 of a voltage maintaining bridge 34 having its second terminal 36 connected to a second control potential output terminal 37 through the winding 38, of a saturable reactor 40 having a core 42. A conductor 44 connects the terminal 37 to the base b of the transistor 20.

The voltage maintaining bridge is of a usual bridge type having a pair of diodes 50 and 52 connected in opposite polarity to the terminal 32 and a second pair of diodes 54 and 56 connected in opposite polarity to the terminal 36. Like polarity terminals of the diodes 50 and 54 are connected together, and like polarity terminals of the diodes 52 and 56 are connected together. A Zener diode 46 is connected between the common polarity connections of the diodes 50–54 and 52–56 in the proper polarity, so that current will flow through the bridge 34 in either direction to maintain a predetermined potential between the terminals 32 and 36. A resistor 48 connected between terminal 36 and winding 14 serves to drop the voltage of the winding 14 to provide the regulated voltage across the bridge 34.

It is believed that the remainder of the details of construction may best be explained by a description of operation of the inverter. Assuming that the transistor 20 is conducting, and current is flowing emitter-to-collector in the transistor 20 and upperhalf of the winding 4 to build up flux in the core 58 in a direction to make the dotted terminals of the windings positive with respect to the undotted terminals. Current from the winding 6 will flow in a direction to keep the transistor 20 conducting and from winding 8 to maintain transistor 22 blocked. A control circuit also exists from the base b of transistor 20 through conductor 44, the saturable reactor 40, the bridge 34 and the winding 10, the conductor 30, the winding 8 and the conductor 24 to the emitter e of the transistor 20. The polarity of the winding 8 is opposite to that of the winding 10. If the turns in the windings 8 and 10 are equal, these two voltages will neutralize each other even though the magnitudes thereof change because of changes of the voltage applied to the winding 4. With equal voltages from the windings 8 and 10, the only voltage acting to saturate the core 42 of the reactor 40 will be that established across the bridge 34 and that which appears between the base and emitter of the conducting transistor 20. The magnitudes of each of these voltages are substantially constant and independent of the magnitude of the input voltage applied to the terminals 16 and 18 and the consequent rate of change in flux in the core 58. With constant voltage applied across the winding 38 of the reactor 40 a substantially constant time will take for saturation of the core 42 and a constant conducting time for the transistor 20. The reactor 40 is so designed that the magnetizing current flowing through the winding 38 prior to saturation of the core 42 is insufficient to reverse the emitter drive current furnished by the winding 6 or to provide current to the transistor 22 to render it conductive.

Subsequent to saturation of the core 42, the voltage established across the bridge 34 will be transferred from across the winding 38 to the control circuit of the transistor 20. The polarity of this potential is opposite to the potential applied by the winding 6 whereby the drive current for the transistor 20 immediately ceases and the resulting reverse voltage maintains the transistor 20 blocked. Additionally the saturating of the reactor 40 and overcoming of the voltage of the winding 6 results in a flow of drive current to the transistor 22 whereby the transistor 22 becomes conducting.

The reversal of the conductive conditions of the transistors 20 and 22 reverses the direction of changing flux in the core 58 of the transformer 2 and reverses the potential in the windings 6, 8, 10 and 14. Reversal of the potential in windings 6 and 8 results in a feedback signal which holds the transistor 20 blocked and the transistor 22 conductive. Reversal of the potential in the windings 10 and 14 reverses the potential applied to the reactor 40 so that it is again in its unsaturated condition and absorbs the substantially constant voltage output of the bridge 34 as described above. In this regard it will be appreciated that the charging current path for the reactor 40 extends from the bridge terminal 36, through winding 38, conductor 44, winding 6, resistor 26, bus 24, emitter $e$ to base $b$ of the transistor 22, conductor 30, and winding 10 to the bridge terminal 32 whereby the windings 6 and 10 are connected in phase opposition. At the end of a predetermined time interval, which is the conducting time of the transistor 22, the core 42 will saturate resulting in the termination of the drive current to the transistor 22 which blocks and the initiation of the drive current to the transistor 20 which thereupon conducts to start a subsequent half cycle as described above. The transistors 20 and 22 will continue to be alternately rendered conductive as described above whereby alternating potential will be generated at the output terminals 61 and 63 of the winding 12 and applied to the load 62.

If as above described, the output voltage of the windings 6, 8 and 10 is equal a substantially constant time period will be required to saturate the reactor 40 irrespective of the magnitude of the input potential applied to the terminals 16 and 18 and the frequency of the output voltage will remain substantially constant. If, however, the number of turns of the winds 6 and 8 is greater than that of the winding 10 whereby the difference between the output voltages of the windings 6 and 8 progressively becomes greater than that of the winding 10, an increase in voltage applied to the terminals 16 and 18 will cause a decrease in the time required to saturate the reactor 40 and therefore an increase in output frequency. Conversely, a decrease in magnitude of the potential applied to the terminals 16 and 18 will result in a decrease in the output frequency. It will be apparent that if the winding 10 has more turns than the windings 6 and 8 the opposite effect will be produced.

While only a single embodiment of the invention has been illustrated in accordance with the patent statutes, it is to be distinctly understood that many modifications may be made and it is desired to cover all modifications falling within the spirit and scope of the invention.

What is claimed and is desired to be secured by United States Letters Patent is as follows:

In an inverter, a pair of power supply terminals, a pair of semiconductor triodes, each said triode having three electrodes and a power current circuit between a first and a second of said electrodes and a control circuit between said first electrode and a third of said electrodes, a transformer having a core and a primary winding with first and second terminals and an intermediate terminal, said transformer further having first and second, third and fourth secondary windings, an alternating current bridge including a Zener diode maintaining a predetermined potential difference between a first and a second terminal of said bridge, an impedance device, means individually connecting said bridge terminals to said fourth winding and including said impedance device, each of said secondary windings having a first and a second terminal, said windings being arranged on said core such that each of said first terminals is of like polarity with respect to its associated said second terminal, means connecting said second electrode of a first of said triodes to said first terminals of said primary winding and said second electrode of a second of said triodes to said second terminal of said primary winding, means connecting one of said power terminals to said intermediate terminal and the other of said power terminals to each of said first electrodes of said triodes, means individually connecting said first and second terminals of said first winding to said first and third electrodes of said first triode respectively, means individually connecting said first and second terminals of said second winding to said third and first electrodes of said second triode respectively, a saturable core reactor having an energizing coil, means connecting said coil and said terminals of said bridge in a series circuit with the voltage produced by said third winding, said voltage produced by said third winding being in phase opposition with the voltage between said bridge terminals, and means connecting said series circuit between said third electrodes and polarized such that the potential across said bridge is in a polarity tending to render the nonconducting one of said triodes into its conducting state.

References Cited by the Examiner
UNITED STATES PATENTS 2,937,298   5/60   Putkovich et al.   331—113.1
2,997,664   8/61   Jensen   331—113.1

ROY LAKE, *Primary Examiner.*

JOHN KOMINSKI, *Examiner.*